March 8, 1932. F. F. CHANDLER 1,848,825

STEERING GEAR PIN MOUNTING

Filed Oct. 7, 1929

INVENTOR.
Franklin F. Chandler
BY
Alexander Powell
ATTORNEYS

Patented Mar. 8, 1932

1,848,825

UNITED STATES PATENT OFFICE

FRANKLIN F. CHANDLER, OF LA FAYETTE, INDIANA, ASSIGNOR TO ROSS GEAR & TOOL COMPANY, OF LA FAYETTE, INDIANA, A CORPORATION OF INDIANA

STEERING GEAR PIN MOUNTING

Application filed October 7, 1929. Serial No. 398,042.

This invention is an improvement in "cam and lever" steering gears such as shown for example in Ross Patent No. 1,567,997, dated December 29, 1925, in which the rocker-arm is actuated by means of a cam on the steering shaft having a helical groove engaged with a pin on an arm of the rocker shaft.

In the present invention the pin and its roller bearings are so constructed that the pin is free to rotate but axial movement of the pin will be prevented. In the accompanying drawings I have illustrated some practical embodiments of the invention, and will explain the same with reference to the drawings to enable others to readily adopt and use the same. In the claims following this description the novel features and novel combinations of parts for which protection is desired are summarized.

Figure 1:
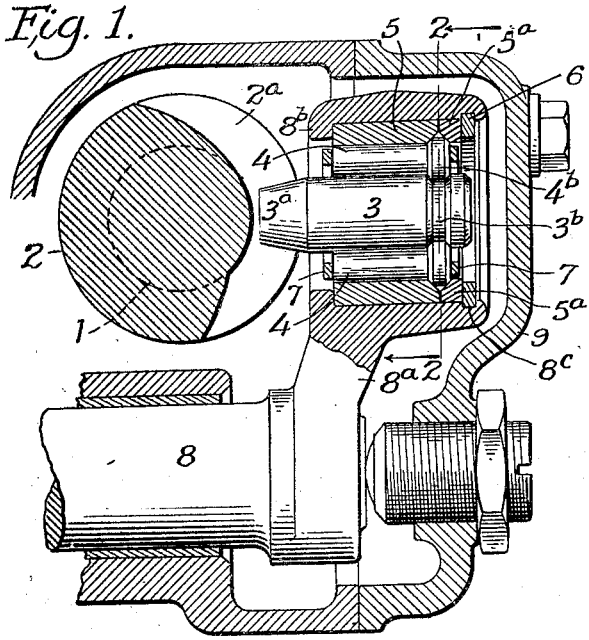
Fig. 1 is a view partly broken away and partly in section of part of a cam and lever steering gear equipped with my novel pin and roller mountings.

The steering gear may be of any suitable construction that shown resembling a Ross cam and lever gear in which the steering shaft 1 is connected to a cylindrical actuating member or cam 2 which is supported and confined in a casing 9 such as used in the said Ross gear.

The cam 2 has a spiral groove 2a in its periphery which is engaged with the head 3a of a pin 3 that is rotatably mounted in the arm 8a of the rocker shaft 8, journaled in bearings in the casing 9.

The opposite side walls of the helical groove 2a in cam 2 are slightly beveled outwardly, and the head 3a of the pin is tapered so that diametrically opposite sides of the head will fit against and closely engage the opposed walls of the cam groove.

Figure 2:
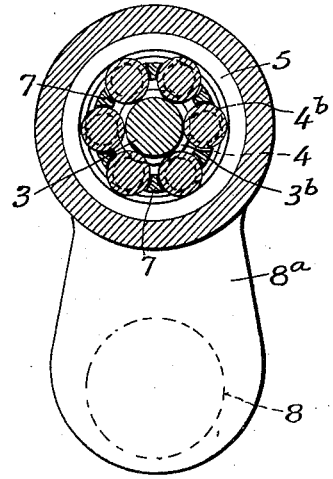
Fig. 2 is a detail section taken on the line 2—2 Fig. 1.

In the construction shown in Figs. 1 and 2 the pin is provided, preferably adjacent its rear end, with an annular groove 3b the walls of which are preferably beveled to engage the oppositely beveled edges of annular flanges or collars 4b on anti-friction rollers 4 which are interposed between the body of the pin and annular bearing members 5, 5a fitted in a bore or opening in the rocker arm 8a. The meeting edges of the members are preferably beveled to engage the oppositely beveled edges of the collars or flanges 4b on the rollers 4 as shown in Fig. 1.

The members 5, 5a may be securely retained in the bore by any suitable means so they will not have any end play therein. As shown the edge of member 5 adjacent the cam abuts against an internal flange 8b at the inner end of the bore in the rocker arm 8a, and the member 5a is securely held in position by means of a ring 6 inserted in an annular groove 8c adjacent the other end of the bore in the arm. The rollers 4 may be suitably spaced apart by an annular cage 7 of any suitable construction, so that the rollers will not bind in the bearings or on the pin and will rotatably support the pin and truly center it in the members 5, 5a so that the collar or flanges 4b will not contact each other.

Figure 3:
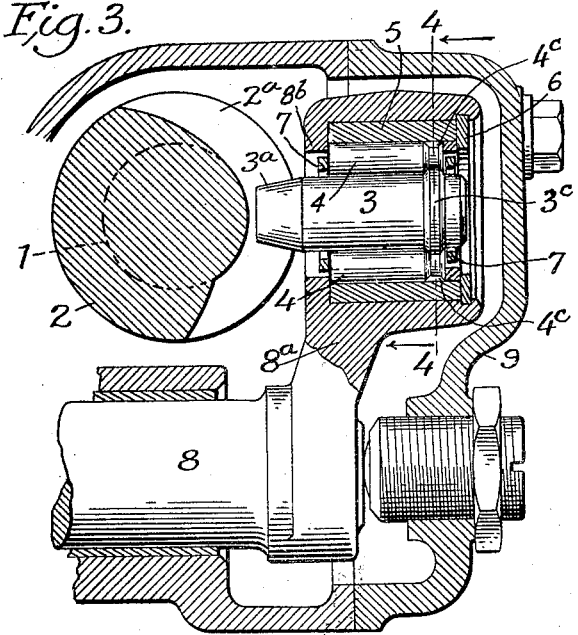
Fig. 3 is a view of a modification.
Figure 4:
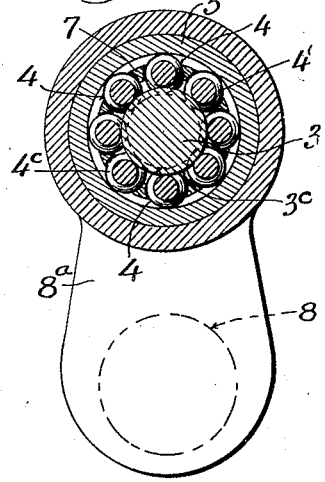
Fig. 4 is a section on the line 4—4 Fig. 3.

In the construction shown in Figs. 3 and 4 the pin is provided with a flange or collar 3c, instead of a groove, and the rollers 4a are provided with grooves 4c instead of flanges; the flange 3c on the pin engages the grooves 4c in the rollers and effectively prevent end play or binding of the pin or rollers in the arm. The construction shown in Figs. 3 and 4 is a reversal of that shown in Figs. 1 and 2 but obviously the flanges could be on the pins and the grooves in the rollers, or the groove could be in the pin and the flanges on the rollers.

Similar parts are similarly lettered in the drawings so that further detailed description of the modification is unnecessary. The modifications shown are merely explanatory and not definitive or restrictive of the invention.

The pin is free to revolve because of the rollers, but the inter-engaging flanges and grooves on the pin and rollers resist end thrust on the pin in both right and left hand directions.

As more fully explained in my application for roller pin (Case 7658) filed September 30, 1929, Serial No. 396,227, when the axis of the pin is directly in the plane of the axis of the cam the relative movement between the head of the pin and the walls of the groove will be uniform along the whole line of contact between the wall of the groove and the side of the pin head; but when the pin passes above or below the plane of the axis of the actuating member, the part of the wall of the groove at the outer end of the line of contact with the side of the pin head will move faster than the part of the wall of the groove at the inner end of such line of contact, and would then exert a wiping action upon the head of the pin which tends to drag or wipe the pin axially inward or outward and if the pin could move axially inward such wiping action would cause the pin to bind in the groove and lock the gear or injure itself or the actuating member.

The interengaging flanges and grooves on the pin and rollers prevent the pin being moved axially and in such construction the pin can neither be drawn into the groove nor forced away from the groove by the wiping action of the walls of the groove on the heads of the pin although the pin is free to revolve in the bushing.

The invention is not restricted to the specific type of gear illustrated, and may be adapted to other types of gears in which one member is operated by a pin engaging a spiral groove in another member.

I claim:

1. In a steering gear, a grooved actuating member, an arm having an opening, a bushing secured against axial movement in the opening, a roller pin mounted in said bushing and engaging the groove in said member, anti-friction rollers interposed between the pin and bushing, said rollers and pin having interengaging circular collars and grooves which permit relative rotation of the pin and rollers but prevent axial relative movement thereof; and means engaging the ends of the rollers to prevent endwise movement of the pin and rollers in the bushing.

2. A steering gear having a spirally grooved actuating member, a rocker shaft, an arm on said shaft projecting beside the actuating member and having an opening, bushings fixedly secured in said opening, a pin axially disposed in said bushings and having a head engaging the groove in said actuating member, rollers interposed between the pin and the bushing, said rollers and pin having interengaging circular collars and grooves which permit relative rotation of the pin and rollers but prevent axial relative movement thereof; and means preventing endwise movement of the rollers in the bushing.

3. A steering gear having a spirally grooved actuating member, a rocker shaft, an arm on said shaft projecting beside the actuating member and having an opening, an annular bushing in said opening, means preventing endwise movement of the bushing in the opening, a pin axially disposed in said bushing and having a head engaging the groove in the actuating member, rollers interposed between the pin and the bushing, said pin and rollers having interengaging circular flanges and grooves permitting relative rotation of the pin and rollers but preventing relative axial movement thereof; and means engaging the rollers to prevent endwise movement thereof in the bushing.

4. In a steering gear, a grooved actuating member, an arm projecting beside the actuating member having an opening with an inwardly projecting flange adjacent one end thereof and an annular groove adjacent the other end thereof; an annular bushing in said opening seated against the said flange, a washer seated in the groove to confine the bushing in place, a pin disposed axially of said bushing and having a head engaging the groove in said actuating member, rollers interposed between the pin and the bushing, said rollers and pin having interengaging circular members which prevent relative axial movement of the pin and rollers but permits relative rotation thereof, and means to prevent endwise movement of the rollers in the bushing.

5. In a steering gear, a grooved actuating member, an arm projecting beside the actuating member having an opening with a flange at one end and an annular groove at the other end; an annular bushing in said opening seated against said flange, a washer seated in said groove confining the bushing in place, a pin axially disposed in said bushing having a head engaging the groove in said actuating member, rollers interposed between the pin and the bushing, said rollers having circular collars engaging circular grooves in the pin and in the bushing whereby axial movement of the pins and rollers in the bushing is prevented.

6. In a steering gear, a grooved actuating member; an arm projecting beside the actuating member having an opening, a flange at one end of the opening and an annular groove at the other end thereof; an annular bushing in said opening seated against said flange; a washer seated in said groove confining the bushing in place; a pin axially disposed in said bushing having a head engaging the groove in said actuating member, rollers interposed between the pin and the bushing, said rollers and pin having interengaging collars and grooves which permit relative rotation of the pin and the rollers but prevent axial relative movement thereof; and means to prevent endwise movement of the rollers in the bushings.

FRANKLIN F. CHANDLER.